United States Patent [19]

Newman

[11] Patent Number: 5,034,116
[45] Date of Patent: Jul. 23, 1991

[54] PROCESS FOR REDUCING THE COARSE-GRAIN CTE OF PREMIUM COKE

[75] Inventor: Bruce A. Newman, Ponca City, Okla.
[73] Assignee: Conoco Inc., Ponca City, Okla.
[21] Appl. No.: 568,448
[22] Filed: Aug. 15, 1990
[51] Int. Cl.[5] .............................................. C10G 9/14
[52] U.S. Cl. ...................................... 208/131; 208/50; 208/57
[58] Field of Search ........................... 208/50, 57, 131

[56] References Cited

U.S. PATENT DOCUMENTS

| | | | |
|---|---|---|---|
| 3,956,101 | 5/1976 | Hara et al. | 208/50 |
| 4,444,650 | 4/1984 | Glaser et al. | 208/131 X |
| 4,518,486 | 5/1985 | Jansma | 208/131 |
| 4,758,329 | 7/1988 | Newman et al. | 208/131 |
| 4,762,608 | 8/1988 | Didchenko et al. | 208/131 X |
| 4,814,063 | 3/1989 | Murakami et al. | 208/50 |
| 4,822,479 | 4/1989 | Fu et al. | 208/131 |
| 4,853,106 | 8/1989 | Grove et al. | 208/131 |
| 4,919,793 | 4/1990 | Mallari | 208/131 |

FOREIGN PATENT DOCUMENTS

135592 1/1989 Japan .

*Primary Examiner*—Curtis R. Davis
*Assistant Examiner*—William C. Diemler
*Attorney, Agent, or Firm*—C. R. Schupbach

[57] ABSTRACT

The coarse-grain CTE of premium coke is reduced by increasing the nominal velocity of the volatile coking by-products in the coking drum to a higher level than the preexisting nominal velocity.

20 Claims, 4 Drawing Sheets

PROCESS FOR REDUCING THE COARSE-GRAIN CTE OF PREMIUM COKE

There is an increasing demand for higher quality premium coke for the manufacture of large graphite electrodes for use in electric arc furnaces employed in the steel industry. Coke of high quality which will yield electrodes of similar high quality must be very crystalline. Two measures of crystallinity are the ¾ inch flour-electrode CTE (coefficient of thermal expansion) and the x-ray CTE. The ¾ inch flour electrode CTE is obtained using a ¾ inch electrode composed of coke "flour", of which nominally 55% passes through a 200 mesh screen. The coke flour electrode is prepared from a mixture of 72 percent flour and 28 percent pitch. The mixture is extruded, baked and finally graphitized. The CTE of the electrode is measured over the temperature range of 30° to 98° C. X-ray CTE is measured on calcined coke instead of on a graphitized electrode. X-ray CTE correlates strongly with flour CTE because both measure the crystallinity of the coke. The correlation between flour CTE and x-ray CTE is presented in FIG. 2 of U.S. Pat. No. 4,822,479 which is hereby incorporated by reference.

Generally, an improvement in coke crystallinity will be reflected by a decrease in either of these CTEs. Highly crystalline coke, however, is not by itself sufficient to insure good commercial electrode performance. To produce commercial electrodes of the lowest CTE (and therefore the best quality) the coke particles must also have high aspect ratios and in general be very needlelike. Aspect ratio is a measurement which is made on coke particles, usually 3×6 mesh particles. The aspect ratio is the average longest measurement of the particle divided by the average shortest measurement. The coke shape (aspect ratio) as well as the coke crystallinity are reflected in coarse-grain CTE measurements which may be made on either 70 mm or ¾ inch electrodes, using the same procedure as set forth above for determining flour electrode CTE. Coarse-grain CTE however is obtained from a blend of 21 percent pitch and 79 percent calcined coke which has been extruded, baked and graphitized to form the desired electrode. The calcined coke used in determining this CTE is a combination of 20 percent 3×6 mesh particles, 20 percent 8×14 mesh particles, 20 percent 20×35 mesh particles and 40 percent coke flour.

The premium coke used in large graphite electrodes is manufactured by delayed coking in which heavy hydrocarbon feedstocks are converted to coke and lighter hydrocarbon products. In the process, the heavy hydrocarbon feedstock is heated rapidly to cracking temperatures and is fed continuously into a coking drum. The heated feed soaks in the drum in its contained heat which is sufficient to convert it to coke and cracked vapors. The cracked vapors are taken overhead and fractionated with the fractionator bottoms being recycled to the feed if desired. The coke accumulates in the drum until the drum is filled with coke at which time the heated feed is diverted to another coke drum while the coke is removed from the filled drum. After removal the coke is calcined at elevated temperatures to remove volatile materials and increase the carbon to hydrogen ratio of the coke.

In the manufacture of large graphite electrodes, calcined premium coke particles obtained from the delayed coking process are mixed with pitch and then baked in an elevated temperature to carbonize the pitch.

It would be desirable to provide a process to reduce the coarse-grain CTE of premium coke and thereby obtain coke suitable for manufacture of improved electrodes.

PRIOR ART

U.S. Pat. No. 3,956,101 to Naoyoshi Hara, et al discloses a delayed coking process in which a heated non-oxidizing gas, such as a light hydrocarbon or hydrogen, nitrogen or steam is bubbled through liquid coker feed in the delayed coker. The gas which has a nominal velocity of 5 to 50 millimeters/sec (approximately 0.017 to 0.17 ft/sec) imparts heat to raise the temperature of the liquid coker feed.

U.S. Pat. No. 4,758,329 to Bruce A. Newman et al discloses a delayed premium coking process in which a highly aromatic feedstock of low molecular weight is sparged with inert gas during the coking cycle. The process increases coke particle size and reduces the CTE of the coke. The velocity of the sparge gas is not given.

U.S. Pat. No. 4,822,479 to Ta-Wei Fu et al discloses a process for the preparation of premium coke in which the feed is coked at lower than normal coking temperature followed by heat soaking in the presence of an inert gas at the same lower temperature.

Japanese Patent 135592-81 discloses a needle coke process in which a coal tar distillate is subjected to delayed coking in the presence of an inert gas blown through the bottom of the coking drum. The gas velocity in the coke drum may vary from 1 to 10 cm/sec (0.034 to 0.34 ft/sec).

THE INVENTION

In accordance with the invention an aromatic mineral oil is subjected to delayed coking conditions in a coking drum to convert the mineral oil to premium coke and to volatile coking by-products having a predetermined nominal velocity in the coking drum and reducing the coarse grain CTE of the premium coke by increasing the nominal velocity of the volatile coking by-products in the coking drum above said predetermined nominal velocity.

In one aspect the invention comprises a process for producing a premium coke having a low coarse grain CTE in which an aromatic mineral oil is subjected to delayed coking conditions to form premium coke and volatile coking by-products whereby the volatile coking by-products have a nominal velocity in said coking drum of at least 0.30 ft/sec.

DETAILED DESCRIPTION OF THE INVENTION

The feedstocks used in the delayed premium coking process of the invention are heavy aromatic mineral oil fractions. These feedstocks can be obtained from several sources including petroleum, shale oil, tar sands, and the like. Specific feedstocks include decant oil, also known as slurry oil or clarified oil, which is obtained from fractionating effluent from the catalytic cracking of gas oil and/or residual oils. Another feedstock which may be employed is ethylene or pyrolysis tar. This is a heavy aromatic mineral oil which is derived from the high temperature thermal cracking of mineral oils to produce olefins such as ethylene. Another feedstock is vacuum resid which is a heavy residual oil obtained from flashing or distilling a residual oil under a vacuum. Still another feedstock is vacuum gas oil which is a lighter material obtained from flashing or distillation under vacuum. Thermal tar may also be used as a feedstock. This is a heavy oil which is obtained from the fractionation of material produced by thermal cracking of gas oil or similar materials. Heavy premium coker gas oil is still another feedstock and is the heavy oil obtained from liquid products produced in the coking of oils to premium coke. Gas oil from coking operations other than premium coking may also be employed as a feedstock. Virgin atmospheric gas oil may also be used as a feedstock. This is gas oil produced from the fractionation of crude oil under atmospheric pressure or above. Any of the preceding feedstocks may be used singly or in combination. In addition, any of the feedstocks may be subjected to hydrotreating and/or thermal cracking prior to their use for the production of premium grade coke.

The operation of the delayed premium coking process is best described by reference to FIG. 1 of the drawings.

Figure 1:
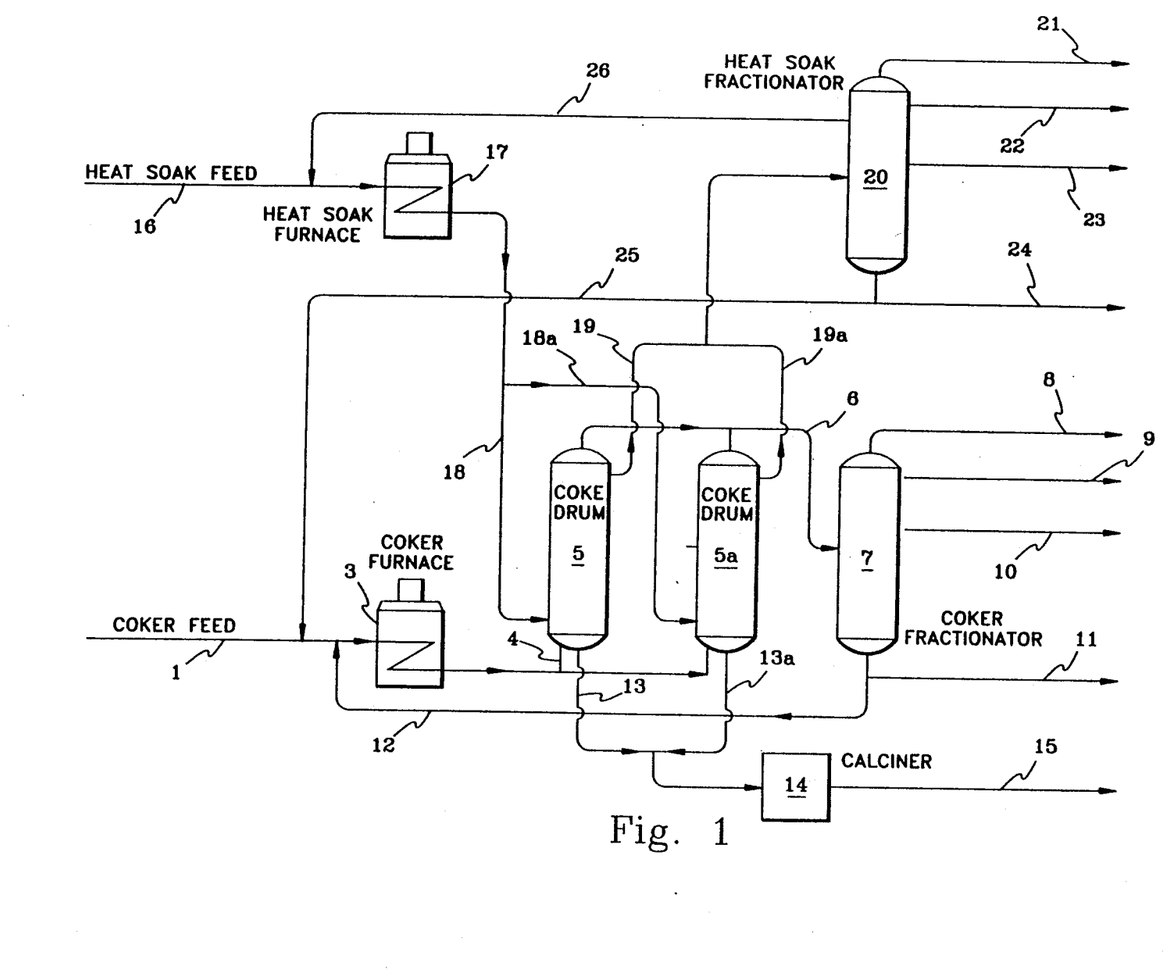
FIG. 1 is a schematic flow diagram of a delayed premium coking process.

Referring now to FIG. 1, feedstock is introduced to the delayed coking process via line 1. The feedstock which in this instance is a thermal tar is heated in furnace 3 to temperatures normally in the range of about 800° to about 1050° F. and preferably between about 850° F. and about 950° F. A furnace that heats the thermal tar rapidly to such temperatures such as a pipestill is normally used. Heated thermal tar exits the furnace at substantially the above indicated temperatures and is introduced through line 4 into the bottom of coke drum 5 which is maintained at a pressure of between about 15 and about 200 psig. The coke drum operates at a temperature in the range of about 780° to about 1000° F. and more usually between about 800° F. and about 925° F. Inside the drum the heavy hydrocarbons in the thermal tar crack to form premium coke and volatile coking by-products.

The volatile coking by-products are continuously removed overhead from the drum through line 6. Coke accumulates in the drum until it reaches a predetermined level at which time the feed to the drum is shutoff and switched to a second coke drum 5 wherein the same operation is carried out. This switching permits drum 5a to be taken out of service, opened and the accumulated coke removed therefrom using conventional techniques. The coking cycle (fill time) may require between about 16 and about 60 hours, but more usually is completed in about 24 to about 48 hours. While two coke drums are shown in the drawing additional drums may be provided as necessary to meet the time cycle requirements of the process.

Volatile coking by-products that are taken overhead from the coke drums in the coking operation are carried by line 6 to a coker fractionator 7. As shown in the drawing, these by-products will typically be fractionated into a $C_1-C_3$ product stream 8, a gasoline product stream 9, a heavy gas oil product stream 10, and a premium coker heavy gas oil taken from the fractionator via line 11. The premium coker heavy gas oil from the fractionator may be recycled at the desired ratio to the coker furnace through line 12. Any excess net bottoms may be subjected to conventional residual refining techniques if desired.

Green coke is removed from coke drums 5 and 5a through outlets 13 and 13a, respectively, and introduced to calciner 14 where it is subjected to elevated temperatures to remove volatile materials and to increase the carbon to hydrogen ratio of the coke. Calcination may be carried out at temperatures in the range of between about 2000° F. and about 3000° F., but preferably calcining is done at temperatures between about 2400° and about 2600° F. The coke is maintained under calcining conditions for between about one-half hour and about 10 hours and preferably between about 1 to about 3 hours. The calcining temperature and time of calcining will vary depending on the properties desired in the final coke product. Calcined premium coke which is suitable for the manufacture of large graphite electrodes is withdrawn from the calciner through outlet 15.

As pointed out previously cokes of high quality which provide electrodes of high quality must be very crystalline. Two measures of crystallinity are flour electrode CTE and x-ray CTE. Generally, an improvement in coke crystallinity will be reflected by a decrease in either of these CTEs. Highly crystalline coke however, is not by itself sufficient to insure good commercial electrode performance. To produce such electrodes, the coke particles must also have high aspect ratios and in general must be very needlelike. Coarse-gain CTE measurements reflect the coke shape as well as coke crystallinity.

In carrying out the process of the invention, the coarse-grain CTE of premium coke obtained in the delayed coking process is improved (reduced) by increasing the nominal velocity of the volatile coking by-products in the coke drum. As used herein the term "nominal velocity" is the velocity determined for an empty coke drum. This increase in the velocity of the coking by-products may be obtained in several ways. For example, the velocity of the volatile coking by-products may be increased by using coke drums which are taller than normal height while maintaining the fill time (coking cycle) at a constant level. In a given operation, when the height of a coke drum is increased the fill time will also increase with the same feed rate. It is desirable to maintain the fill time at the same level when the coke drum height is increased in order to insure maximum conversion of the feed to the desired coke product. Thus, if the coke drum height is increased 50 percent, the feed rate is also increased 50 percent to maintain the same fill time.

The normal height of commercial coke drums is about 70 feet. While any increase in height will have a beneficial effect on coarse-grain CTE practical considerations will limit coking drum heights to about 100 to about 150 feet.

Another procedure which may be used to increase the nominal velocity of the volatile coking by-products is to reduce the length of the fill period, which is accomplished by increasing the feed rate. The velocity of the volatile coking by-products is approximately proportional to the feed rate since with variable feed rates approximately the same percentage of feed is converted to volatile by-products gases. Thus, if the feed rate is increased by 50 percent (reducing the fill rate by one-third) the velocity of the volatile coking by-products would also increase 50 percent. When the fill time is reduced, the feed to the coker is subjected to coking conditions, i.e. temperatures and pressure for a shorter period of time. As a result the coking reactions are not completed to give the desired coke product. This may be remedied by subjecting the coke to a heat soak such as shown in FIG. 1 of the drawing to finish the coking reactions.

Referring now to FIG. 1 the heat soak when required is carried out prior to removing the coke from coke drum 5. The heat soak is effected by a non-coking fluid which is introduced to the unit though line 16, is heated in heat soak furnace 17 and passed from the heat soak furnace as a vapor though line 18 into the bottom of the coke drum. The heat soak material exits from the top of the coke drum through line 19 and is introduced to heat soak fractionator 20. The vapor stream entering fractionator 20 contains not only the heat soak material but also volatile by-product materials released from the coke during the heat soak operation. Within the fractionator 20 the vapors are fractionated into a $C_1-C_3$ product stream 21, a gasoline stream 22, a heavy gas oil stream 23, and a still heavier gas oil which is removed from the fractionator via line 24. If desired, a portion of the latter material may be combined with the feed to the coker.

Any material which is non-coking and does not affect the properties of the premium coke may be used as the heat soak material. For example, the heat soak material may be a liquid hydrocarbon fraction or a normally gaseous material such as light hydrocarbons, nitrogen, steam or the like. Usually a distillate or a light gas oil will be employed since these materials are readily available and are unaffected by the heat soak temperature. In this instance, a light gas oil is used as the heat soak material. If desired, it may be recovered from the heat soak fractionator and recycled to the heat soak furnace through line 26.

The heat soak operation normally will be carried out over a time period of between about 4 and about 60 hours and preferably from about 8 to about 32 hours. The particular time employed depends on the feedstock used in the coking operation, the time of coking, and the coking temperature.

The heat soak is usually be carried out at the same temperature as the coking operation; however, if desired, either higher or lower heat soak temperatures may be used.

The minimum heat soak time may be determined from the following equation:

Time = exp(0.050 $f_a$ − 42.8 + 52873/T)

where
T = temperature of the coke during the heat soak—°-Rankine
Time = heat soak time—hours $f_a$ = the percentage of aromatic carbon atoms present in the mineral oil feed as determined by $C^{13}$ NMR analysis Further details concerning heat soak conditions and the above formula are set forth in U.S. Pat. No. 4,822,479.

This aspect of the process has been described as utilizing both a coker fractionator and a heat soak fractionator. It is within the scope of the invention however, to carry out both operations in a single fractionator, in which event the effluent from the coke drums during both coking and heat soak would be fed to this fractionator. All of the streams normally recovered from the two fractionators would then be obtained from the single fractionator.

Still another procedure for increasing the velocity of the volatile coking by-products in the coke drum involves changing the aromaticity of the coker feedstock. This procedure utilizes the information contained in FIGS. 2 and 3. The data plotted in these figures was obtained by subjecting a substantial number of mineral oil feedstocks to delayed coking conditions as described in Example 4.

Figure 2:
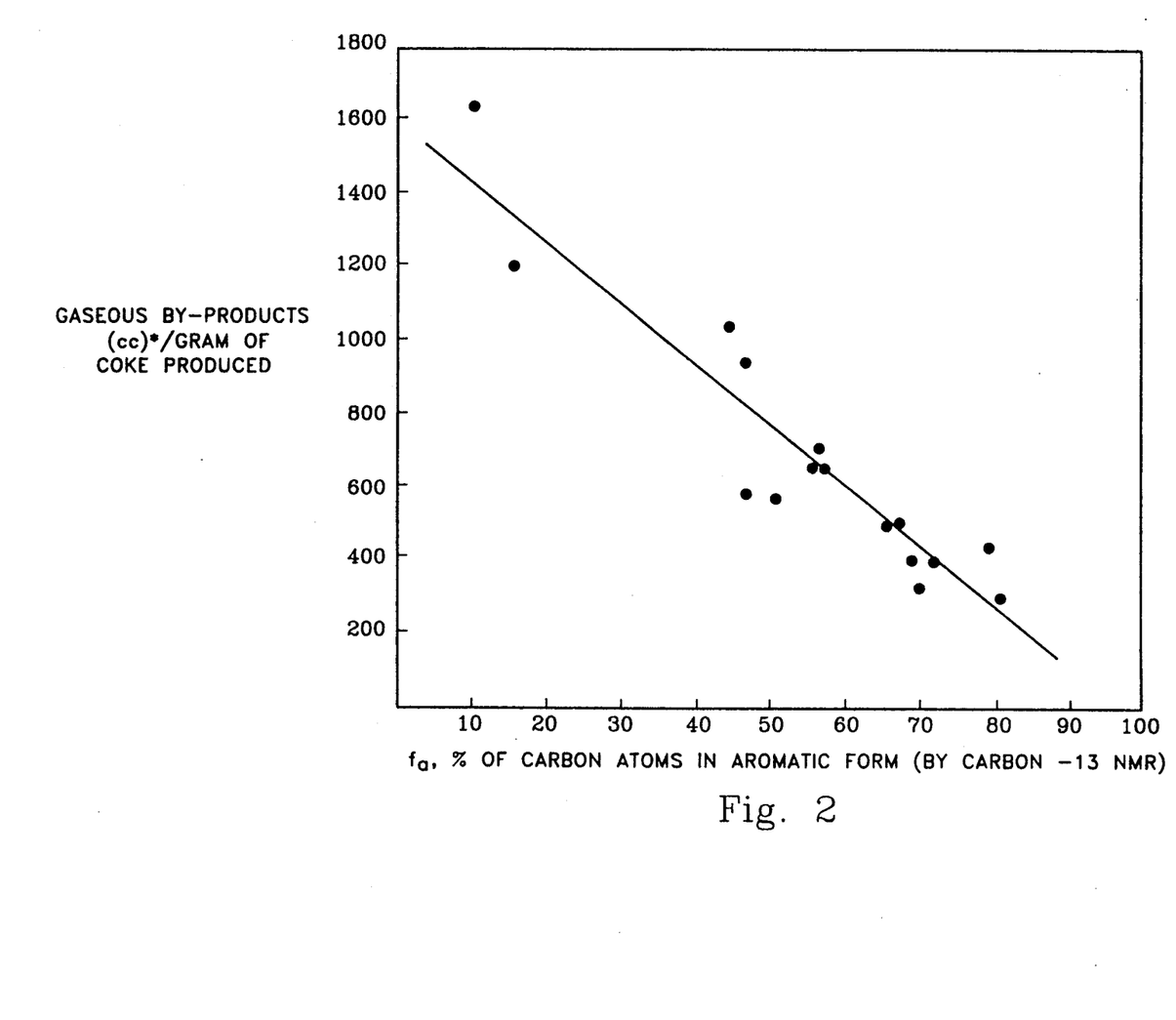
FIG. 2 is a plot of the quantity of gaseous by-products produced in a delayed premium coking process versus the aromaticity of the coking feedstock.
Figure 3:
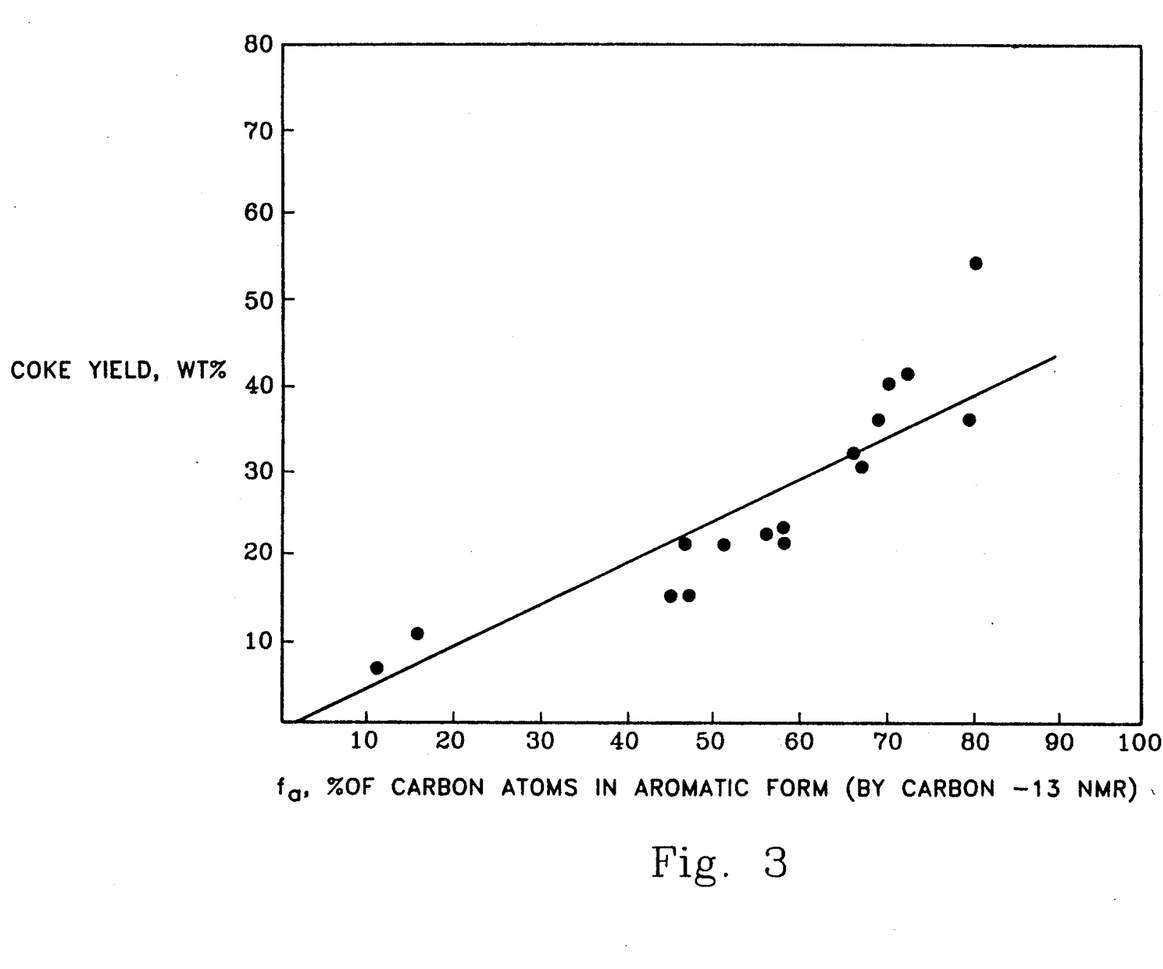
FIG. 3 is a plot of coke yield versus feed stock aromaticity in a delayed premium coking process.

The correlations of FIGS. 2 and 3 make it possible to determine how to change the aromaticity of the coker feedstock to increase the coker by-product gas velocity in the coke drum. FIG. 2 illustrates that the coker by-product gas velocity (which is linearly related to the evolution of gas per gram of coke produced) is related to the feedstock aromaticity, $f_a$. Using the correlation of FIG. 2, the following relationship exist:

Constant × (by-product gas velocity, V)/(gram of coke produced)
= (gas evolution (cc)/(gram of coke produced)     (1)
= 1633 − 17.1 × $f_a$     (2)

This Equation (2) can be used to calculate the feedstock aromaticity, $f_{a,n}$ required to produce some desired by-product velocity $V_n$ in a coke drum if, for example, a feedstock of aromaticity $f_a$ yields a known by-product gas velocity V in the same coke drum. This can be accomplished by developing the following equations from Equation (2):

Constant × V/(gram of coke) = 1633 − 17.1 × $f_a$     (3)

Constant × $V_n$/(gram of coke) = 1633 − 17.1 × $f_{a,n}$     (4)

Dividing Equation 3 by Equation 4 yields:

V/$V_n$ = (1633 − 17.1 × $f_a$)/(1633 − 17.1 × $f_{a,n}$)     (5)

Solving, then, for $f_{a,n}$:

$f_{a,n}$ = [1633 − ($V_n$/V) × (1633 − 17.1 × $f_a$)]/17.1     (6)

If, for example, $f_a$ = 50%, $V_n$ = 0.20 ft/sec, and V = 0.15 ft/sec, $f_{a,n}$ would solve from Equation 6 to equal 34.8%.

There are several procedures which may be used to reduce the feedstock aromaticity from 50 to 34.8 wt % in this example. As shown by the data in Table 1, feedstock aromaticity can be reduced by increasing the severity of feedstock hydrotreating (Runs 8-11) or by reducing the severity of feedstock thermal cracking (Runs 14-16). Another method is to mix aliphatic coker feeds, such as the resids shown in Table 5, with more aromatic feedstocks, such as decant oils or pyrolysis tars.

Equation 2 may be used to predict the proper feedstock aromaticity to produce the desired by-product gas velocity level in the coke drum, However, it should be noted that as the feedstock aromaticity changes, so does the coke yield as shown in FIG. 3. Hence, as the feedstock aromaticity changes, so also will the coke production if the feed rate remains constant. Therefore, to maintain constant coke production (which is shown in the equality of Equation (2), it is also necessary to change the coker feed rate.

The proper change of feed rate may be determined by using the following equations from the correlation of FIG. 3:

$$\text{coke yield} = 0.48 \times f_a \quad (7)$$

$$\text{coke yield}_n = 0.48 \times f_{a,n} \quad (8)$$

Dividing Equation 7 by Equation 8 gives:

$$\text{coke yield}/\text{coke yield}_n = f_a/f_{a,n} \quad (9)$$

and, solving for coke yield$_n$:

$$\text{coke yield}_n = \text{coke yield} \times (f_{a,n}/f_a) \quad (10)$$

In our example, the coke yield from the initial feedstock with $f_a = 50\%$ is 24 wt % (this is obtained from FIG. 3), therefore the coke yield$_n$ would be calculated from Equation 10 to be:

$$24 \text{ wt } \% \times 34.8\%/50.0\% = 16.7\%$$

Hence, the initial feed rate which gives by-product velocity V must be multiplied by coke yield/coke yield$_n$ (which equals 24 wt %/16.7 wt % in our example) to maintain a roughly constant level of coke production as the feedstock aromaticity changes. Using Equation 9, the new feed rate (feed rate$_n$) is given by:

$$\text{feed rate}_n = \text{feed rate} \times (\text{coke yield}/\text{coke yield}_n) \quad (11)$$
$$= \text{feed rate} \times (f_a/f_{a,n}) \quad (12)$$

By satisfying Equation 12, in addition to and Equation 6, it is possible to use changes in feedstock aromaticity to increase the by-product gas velocity in the coke drum.

Any of the processing procedures which have been described, either alone or in combination, may be used to increase the velocity of the volatile coking by-products in the coke drum.

In conventional coking operations, the nominal velocity of the volatile coking by-products in the coke drum may range from levels below 0.10 ft/sec to as high as 0.28 ft/sec. Utilizing the processing procedures described, the velocity of these by-products may be increased to 3.0 ft/sec or higher depending on the properties desired in the coke product. Preferably, the nominal velocity of the volatile coking by-products is increased to at least 0.30 ft/sec and may be raised as high as 1.0 ft/sec or higher.

The velocity of the volatile coking by-products in the coking drum may be calculated by the following formula:

$$*V = F \times \left(1 - \frac{Y}{100}\right) \times \frac{T \times 3.29}{P \times M \times A}$$

where
V = nominal velocity of volatile coking by-products—ft/sec
F = mineral oil feed rate—g/sec
Y = coke yield—% of mineral oil feed
T = coke bed temperature in coking drum—°Rankine
P = coking drum pressure—psia
M = molecular weight of volatile coking by-products—g/g-mole
A = coking drum cross-sectional area—in$^2$
*Dimensional conformance of the equation variables is provided in the constant—3.29

In every delayed premium coking process, the particular feedstocks or feedstocks used and the coking conditions employed determine the velocity of the volatile coking by-products in the coke drum. As previously mentioned, this predetermined velocity may range from less than 1.0 ft/sec to as high as 0.28 ft/sec. The process of the invention may be used to increase the velocity of the volatile coking by-products in the coke drum above the predetermined level of an existing operation (whatever that level may be) and thus provide a desired reduction in the coarse-grain CTE of the coke product. The end result of course, is a commensurate improvement of the quality of the coke, and of the electrodes which are eventually made from the coke.

While the inventive process will provide more substantial improvement where the predetermined velocity of the volatile coking by-products in the coking drum is low, any increase in volatile coking by-product velocity above the predetermined velocity will provide some improvement in coke coarse-grain CTE.

The various aspects of the invention may be illustrated by using specific information provided in the examples. The operation used for illustration comprises coking 150 barrels per hour of an aromatic thermal tar ($f_a = 75.0$) which as been subjected to hydrotreating and thermal cracking. The thermal tar is coked at a temperature of 900° F. and a pressure of 60 psig in a 70 foot coke drum utilizing a fill time of 48 hours. The predetermined nominal velocity of the volatile coking by-products in the coke drum is 0.15 feet per second.

Figure 4:
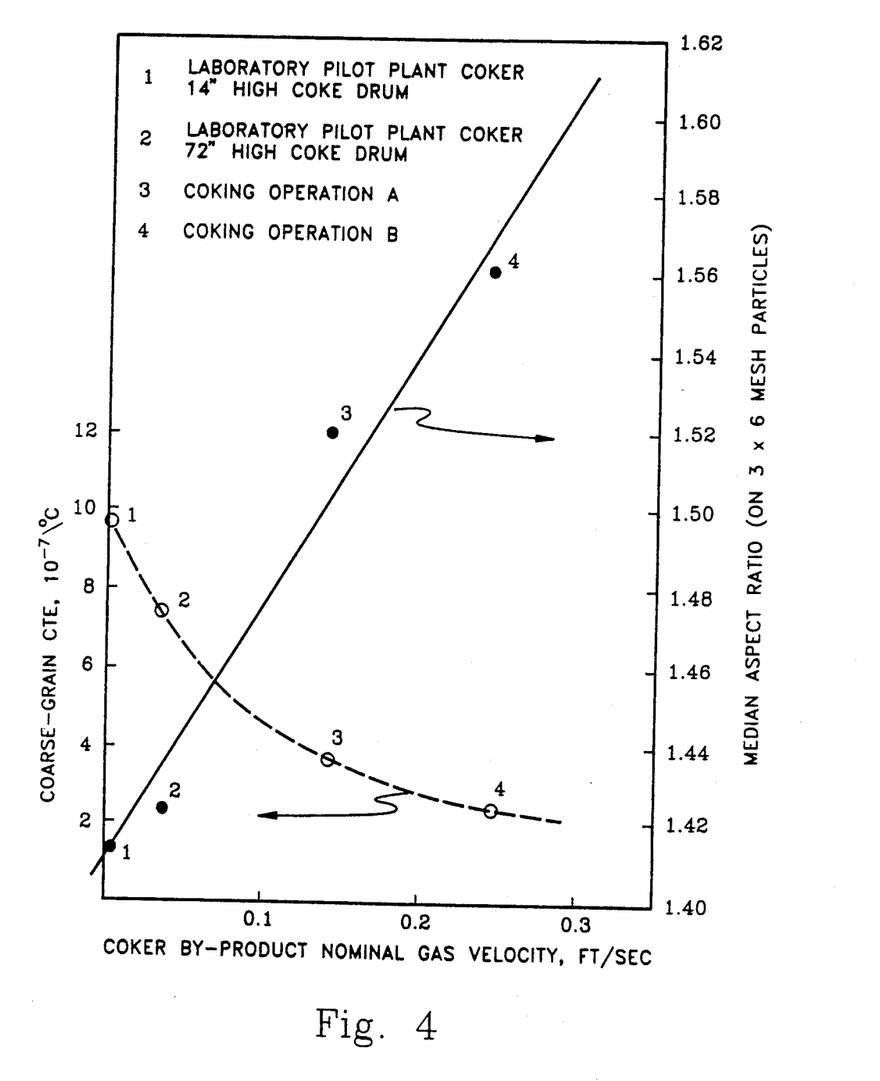
FIG. 4 is a plot of coker by-products gas velocity versus coarse grain coke CTE and versus coke aspect ratio in a delayed premium coking process.

If we refer now to FIG. 4 of the drawings, we find that the coarse-grain CTE of coke produced from the described operation has a value of $3.5 \times 10^{-7}/°C$. In order to improve the coarse-grain CTE of the coke product the nominal velocity of the volatile coking by-products is increased from 0.15 to 0.20 ft/sec. Utilizing the same figure the coarse-grain CTE of the coke product is thereby reduced from $3.5 \times 10^{-7}/°C$. to $2.8 \times 10^{-7}/°C$., a 20 percent improvement in CTE.

In one procedure the desired increase in the nominal velocity of the volatile coking by-products from 0.15 to 0.20 ft/sec is obtained by increasing the height of the coke drum in which the coking reaction is carried out. At the same time, the fill time of the coke drum is maintained constant to maintain the quality of the coke product. Thus, as the height (and volume) of the coke drum is increased the feed rate of the aromatic tar is correspondingly increased to maintain a constant coke drum fill time. Since the volume of the coke drum, the volume of the thermal tar feed and the volume of the volatile coking by-products are directly proportional to each other, when the velocity of the coking by-products is increased from 0.15 to 0.20 ft/sec (a 33 percent increases), a corresponding increase in coke drum height and mineral oil feed rate are also carried out. Thus, the coke drum height is increased from 70 feet to 93 feet. At the same time, the feed rate of the thermal tar (required to maintain the 48 hour fill rate) is increased from 150 to 200 barrels per hour.

In another procedure for obtaining the desired increase in the velocity of the volatile coking by-products the fill time of the coke drum is decreased. This result is obtained by increasing the feed rate of the thermal tar to the drum. To obtain the desired increase in the velocity of the volatile coking by-products from 0.15 to 0.20 ft/sec the feed rate is increased to 0.20 divided by 0.15 times 150 barrels per hour or 200 barrels per hour. When using this procedure, the time during which the coke is formed in the coke drum is reduced since the fill time is shorter (from 48 hours originally to 36 hours) As a result, the coking reactions which are required to provide the desired quality of coke do not continue to completion. This deficiency in coking time is remedied by subjecting the contents of the coke drum to a heat soak. The heat soak is carried out at a temperature of 900° F. and a pressure of 60 psig using coker distillate as the heat soak material. The heat soak is carried out for a minimum period of time determined from the equation:

$$\text{Time} = \exp(0.050 f_a - 42.8 + 52873/T)$$

When this equation is solved, the heat soak time is determined to be a minimum of 0.84 hours.

In yet another procedure, the increase in the velocity of the volatile coke by-products from 0.15 to 0.20 ft/sec is realized by changing the composition (aromaticity) of the feedstock to the coking reaction. This change in aromaticity is effected by combining the aromatic thermal tar with a feedstock of lower aromaticity, namely an aliphatic thermal tar having an $f_a$ of 43.0. The aromaticity ($f_{a,n}$) of the new feed which is required to effect the desired change in velocity from 0.15 to 0.20 is calculated from the following equation:

$$f_{a,n} \leq [1633 - (V_n/V) \times (1633 - 17.1 \times f_a)]/17.1$$

The result is a feedstock which now has an $f_{a,n}$ of no more than 68.2. This feedstock is obtained by using a 79 to 21 weight percent mixture of the aromatic thermal tar and the aliphatic thermal tar.

Since the new feedstock has a lower aromatic content, the same amount of feed would produce less coke and thus Equation (2) would not be satisfied. It is necessary therefore to increase the feed rate to the coker by a sufficient amount so that the same amount of coke is obtained in both operations. The new feed rate ($R_n$) is obtained from the following equation:

$$R_n \geq = R \times f_a/f_{a,n}$$

$$= 150 \frac{\text{barrels}}{\text{hour}} \times 75/68.2$$

The new feed rate obtained from this formula is a minimum of 165 barrels

As noted, the aromatic thermal tar used as the feedstock in the above illustration has been subjected to both hydrotreating and thermal cracking. Hydrotreating is a conventional process which is often used to precondition coking feedstocks since it has the effect of reducing the sulfur content of such feedstocks. By virtue of the reactions which take place during hydrotreating, the aromatic content of the feedstock is also reduced. Hydrotreating conditions may vary considerably, but usually include a temperature in the range of about 600° to 850° F., a pressure from about 500 to 2,500 psig, a hydrogen partial pressure from about 350 to 2500 psig, a liquid hourly space velocity from 0.2 to 6.0 and a hydrogen rate of about 1,000 to about 5,000 standard cubic feet per barrel of oil which is being hydrotreated. Since hydrotreating tends to reduce aromatic content, the procedure set forth above for increasing the velocity of the volatile coking by-products by reducing the aromaticity of the feedstock used in the coking process is effected by subjecting the aromatic feedstock to more severe hydrotreating conditions. Such more severe conditions may include higher hydrotreating temperatures, lower liquid hourly space velocity, increased hydrogen rate, or a combination thereof.

Thermal cracking of coker feedstocks is usually carried out at temperatures from about 850° to 1,100° F. and pressures from about 300 to about 1,000 psig. The thermal cracking operation usually has the effect of increasing the aromaticity of the coker feedstock. In practicing the above procedure where the increase in velocity of the volatile coking by-products is increased from 0.15 to 0.20 ft/sec by reducing the aromaticity of the coker feed, such reduction is obtained by reducing the severity of the thermal cracking operation. Such reduction is obtained by reducing the temperature at which thermal cracking of the thermal tar is carried out.

The following examples are presented in illustration of the invention:

Tests were carried out in Examples 1, 2 and 3 using mineral oil feedstocks, the properties of which are given in Table 1.

TABLE 1

| Description | A Hydrotreated Decant Oil | B Hydrotreated Decant Oil | C Aliphatic Thermal Tar | D Aliphatic Thermal Tar | E Aromatic Thermal Tar | F Aromatic Thermal Tar |
|---|---|---|---|---|---|---|
| API Gravity | 7.5 | 1.4 | 9.4 | 7.3 | −2.5 | −1.8 |
| Specific Gravity, 60/60° F. | 1.018 | 1.065 | 1.004 | 1.019 | 1.097 | 1.098 |
| ASTM D-1160, °F. at 760 mm Hg | | | | | | |
| IBP | 419 | 489 | — | — | 548 | 422 |
| 5 Vol % | 589 | 605 | — | — | 610 | 516 |
| 10 | 641 | 650 | — | — | 665 | 572 |
| 20 | 680 | 688 | — | — | 693 | 614 |
| 30 | 707 | 708 | — | — | 720 | 639 |
| 40 | 728 | 727 | — | — | 744 | 651 |
| 50 | 752 | 746 | — | — | 768 | 680 |
| 60 | 772 | 768 | — | — | 803 | 709 |
| 70 | 802 | 795 | — | — | 843 | 745 |

TABLE 1-continued

| Description | A Hydrotreated Decant Oil | B Hydrotreated Decant Oil | C Aliphatic Thermal Tar | D Aliphatic Thermal Tar | E Aromatic Thermal Tar | F Aromatic Thermal Tar |
|---|---|---|---|---|---|---|
| 80 | 850 | 819 | — | — | 872 | 792 |
| 90 | 903 | 883 | — | — | — | — |
| End Point | 910 | 942 | — | — | 940 | — |
| Recovery, vol % | 92 | 96 | — | — | 87 | — |
| Alcor Carbon Residue, wt. % | 1.96 | — | 5.12 | 4.85 | 6.25 | 6.75 |
| Sulfur, wt. % | 0.17 | — | 0.59 | 0.44 | 0.40 | 0.50 |
| Aromatic Carbon by $^{13}$C-NMR, wt. % | 52.8 | — | 43.3 | — | 74.7 | 70.2 |

EXAMPLE 1

Delayed coking tests were carried out in a 1.8" diameter × 72" high coke drum with aromatic thermal tars (Feedstocks E and F). Nitrogen and distillate sparge gases were fed to the coke drum during the hydrocarbon feed fill cycle. Distillate was used in runs 1 and 2 and nitrogen was used in the other runs. Conditions used in the tests and the results are set forth in Table 2.

It is noted from Table 2 that the use of sparge gas adversely affects (increases) the coke CTE obtained by the coarse-grain electrode method and has very little effect on coke CTE measured by the x-ray method. At least two possible reasons exit for this. First, the sparge gas may not interact intimately enough with the mesophase as it converts from liquid to solid, and therefore does not promote formation of the needlelike particles that are required to produce electrodes of low coarse-grain CTE. Second, the sparge gas may cause stripping of low molecular weight components (which reduces the yield of coke), forcing the formation of coke only from high molecular weight feedstock components which are less likely to form a needlelike structure consistent with low coarse-grain CTE.

EXAMPLE 2

TABLE 2

| | | | Fill Period | | | | | Electrode CTE, $10^{-7}$/°C. | |
|---|---|---|---|---|---|---|---|---|---|
| Run No. | Feedstock | Feed Rate, g/min | Sparge Gas Liter/min | Drum Vapor Temperature, °F. | Fill Time, hrs | Total Reaction Time, hrs | Nominal Gas Velocity,* ft/sec | Coke Yield, wt. % | by X-Ray Method | by Coarse-Grain Method |
| 1 | E | 6.0 | 0.3 | 875 | 24 | 24 | .025 | 18.6 | 2.4 | 7.7 |
| 2 | E | 7.5 | 0.4 | 878 | 24 | 24 | .030 | 23.5 | 1.5 | 6.8 |
| Avg. | | | | | | | .028 | | 2.0 | 7.3 |
| 3 | E | 11.5 | 3.5 | 879 | 24 | 24 | .083 | 13.5 | 2.8 | 7.6 |
| 4 | E | 11.5 | 3.5 | 884 | 24 | 24 | .083 | 11.8 | 1.7 | 8.8 |
| Avg. | | | | | | | .083 | | 2.3 | 8.2 |
| 5 | E | 13.0 | 9.1 | 875 | 24 | 24 | .184 | 8.2 | 1.8 | 9.5 |
| 6 | E | 15.0 | 10.0 | 883 | 24 | 24 | .203 | 6.7 | 1.7 | 8.8 |
| 7 | E | 16.0 | 10.0 | 876 | 24 | 24 | .206 | 6.9 | 1.8 | 9.7 |
| 8 | F | 16.0 | 10.0 | 900 | 21 | 21 | .208 | 7.4 | 2.2 | 10.4 |
| 9 | F | 18.0 | 10.0 | 909 | 24 | 24 | .213 | 7.1 | 2.2 | 9.7 |
| Avg. | | | | | | | .203 | | 1.9 | 9.6 |
| 10 | F | 18.0 | 22.0 | 875 | 24 | 24 | .418 | 4.9 | 1.9 | 9.3 |
| 11 | F | 25.0 | 22.0 | 881 | 24 | 24 | .431 | 6.8 | 2.5 | 8.8 |
| 12 | F | 22.0 | 22.0 | 910 | 24 | 24 | .434 | 4.6 | 2.4 | 10.0 |
| Avg. | | | | | | | .428 | | 2.3 | 9.4 |

Coke was produced in several delayed coking tests from two hydrotreated decant oils (Feedstocks A and B). Two different coke drums were used, one 3.5" diameter × 14" high and the other 1.8" diameter × 72" high. Conditions used in the tests and the test results are given in Table 3.

TABLE 3

| | | | | Fill Period | | | Nominal By- | | Electrode CTE, $10^{-7}$/°C. | |
|---|---|---|---|---|---|---|---|---|---|---|
| Coke Drum | Run No. | Feedstock | Feed Rate, g/min | Drum Vapor Temperature, °F. | Fill Time, hrs | Total Reaction Time, hrs | Product Gas Velocity ft/sec | Coke Yield, wt. % | by X-Ray Method | by Coarse-Grain Method |
| 14" Long | 1 | A | 7.0 | 902 | 24 | 24 | .0045 | 24.8 | 1.6 | 9.9 |
| " | 2 | A | 4.8 | 878 | 24 | 48 | .0030 | 27.3 | 1.1 | 8.9 |
| " | 3 | A | 5.0 | 905 | 24 | 24 | .0032 | 25.5 | 1.2 | 10.0 |
| " | 4 | A | 4.6 | 906 | 24 | 24 | .0031 | 22.8 | 1.1 | 9.7 |
| " | 5 | A | 3.5 | 862 | 37 | 37 | .0022 | 26.5 | 1.5 | 9.0 |
| " | 6 | A | 2.3 | 878 | 47 | 47 | .0013 | 32.5 | 1.0 | 9.9 |
| Avg. | | | | | | | .0029 | | 1.3 | 9.6 |
| 72" Long | 7 | A | 29.8 | 901 | 8 | 8 | .057 | 10.5 | 1.7 | 7.7 |
| " | 8 | A | 12.1 | 885 | 24 | 48 | .023 | 11.6 | 1.3 | 5.9 |
| Avg. | | | | | | | .040 | | 1.5 | 6.8 |
| 72" Long | 9 | B | 29.9 | 904 | 8 | 8 | .059 | 9.0 | 1.6 | 7.9 |
| " | 10 | B | 25.0 | 904 | 12 | 12 | .048 | 10.5 | 1.4 | 7.4 |
| " | 11 | B | 24.0 | 883 | 12 | 12 | .045 | 12.1 | 1.6 | 7.9 |
| " | 12 | B | 20.7 | 886 | 12 | 36 | .039 | 12.7 | 1.8 | 6.4 |
| " | 13 | B | 10.0 | 899 | 24 | 24 | .019 | 10.5 | 1.0 | 6.5 |

TABLE 3-continued

| Coke Drum | Run No. | Feedstock | Fill Period Feed Rate, g/min | Fill Period Drum Vapor Temperature, °F. | Fill Time, hrs | Total Reaction Time, hrs | Nominal By-Product Gas Velocity ft/sec | Coke Yield, wt. % | Electrode CTE, $10^{-7}$/°C. by X-Ray Method | Electrode CTE, $10^{-7}$/°C. by Coarse-Grain Method |
|---|---|---|---|---|---|---|---|---|---|---|
| " | 14 | B | 16.0 | 907 | 24 | 24 | .031 | 10.6 | 1.7 | 8.4 |
| " | 15 | B | 14.0 | 886 | 24 | 24 | .026 | 12.7 | 1.2 | 7.6 |
| Avg. | | | | | | | .038 | | 1.5 | 7.4 |

The data in Table 3 show that drum velocities are roughly an order of magnitude higher in the 72 inch drum. The data further show that changing the height of the coke drum has very little effect on coke crystallinity, as reflected by the x-ray CTEs. However coarse-grain CTEs are significantly lower for the cokes produced in the taller coke drum, because the higher by-product gas velocity promotes production of coke with more needle-like shape. It is noted that a similar benefit was not found in Example 1 when sparge gas was added to the coke drum to increase the nominal vapor velocity. Since coarse-grain CTE is the best measure of utility of coke to the end user, these data indicate that increasing the height of the coke drum improves coke and electrode quality.

EXAMPLE 3

Using the coke drums of Example 2 delayed coking tests were carried out as feedstocks relatively aliphatic thermal tars (feedstocks C and D). Conditions used in the tests and the test results are shown in Table 4.

The data in Table 4 shows that for cokes of roughly equivalent crystallinity (as shown by similar x-ray CTEs), the coke produced in the taller, higher by-product velocity coke drum has significant lower coarse-grain CTE.

EXAMPLE 4

Sixteen mineral oil feedstocks varying in aromaticity ($f_a$) from 10.6 to 80.5 were delayed coked in a laboratory coker at 60 psig and 900° F. for 8 hours. Feedstock descriptions and coking results are shown in Table 5.

TABLE 5

| Run No. | Feedstock Description | Topping Temp. °F. | Feedstock Aromaticity[a] $f_a$ | Coke Yield[b] wt. % | Total Gaseous By-products In the Coke Drum,[c] cc/gram of Coke |
|---|---|---|---|---|---|
| 1 | Thermal Tar | 720 | 79.3 | 35.6 | 433 |
| 2 | Thermal Tar | 720 | 69.3 | 36.5 | 402 |
| 3 | Thermal Tar | 720 | 50.8 | 22.8 | 568 |
| 4 | Thermal Tar | 720 | 46.6 | 21.2 | 595 |
| 5 | Resid | — | 10.6 | 7.2 | 1653 |
| 6 | Hydrotreated Resid | 900 | 15.8 | 10.6 | 1208 |
| 7 | Slurry Oil | 720 | 67.5 | 29.6 | 503 |
| 8 | Hydrotreated Slurry Oil (362 SCFB)[d] | 720 | 58.1 | 22.9 | 657 |
| 9 | Hydrotreated Slurry Oil (459 SCFB) | 720 | 57.6 | 21.1 | 706 |
| 10 | Hydrotreated Slurry Oil (1228 SCFB) | 720 | 47.4 | 15.2 | 951 |
| 11 | Hydrotreated Slurry Oil (1393 SCFB) | 720 | 44.6 | 14.8 | 1044 |
| 12 | Pyrolysis Tar | 720 | 70.2 | 39.7 | 319 |
| 13 | Thermal Cracker Feed | 720 | 55.9 | 22.4 | 663 |
| 14 | Low Severity Thermal Tar | 720 | 66.2 | 31.7 | 489 |
| 15 | Mid Severity Thermal Tar | 720 | 72.4 | 41.2 | 393 |
| 16 | High Severity Thermal Tar | 720 | 80.5 | 53.8 | 304 |

[a]By carbon -13 NMR analysis.
[b]Coke yield is given on the topped feedstock described.
[c]All gas values are given at ambient temperature and atmospheric pressure.
[d]Values in parentheses refer to hydrogen uptake by the coker feedstock during hydrotreating.

The data in Table 5 may be plotted to show the correlation between by-product gas produced and feedstock aromaticity (FIG. 2) and the correlation between coke yield and feedstock aromaticity (FIG. 3).

EXAMPLE 5

Coke aspect ratios obtained by optical image analysis for cokes evaluated in Examples 2 and 3 are summarized in Table 6. Also included are coker by-product gas velocity and aspect ratios for two larger scale coking operations A and B.

TABLE 4

| Coke Drum | Run No. | Feedstock | Fill Period Feed Rate, g/min | Fill Period Drum Vapor Temperature, °F. | Fill Time, hrs | Total Reaction Time, hrs | Nominal By-Product Gas Velocity, ft/sec | Coke Yield, wt. % | Electrode CTE, $10^{-7}$/°C. by X-Ray Method | Electrode CTE, $10^{-7}$/°C. by Coarse-Grain Method |
|---|---|---|---|---|---|---|---|---|---|---|
| 14" Long | 16 | C | 17.7 | 895 | 5 | 5 | .0127 | 16.4 | 2.1 | 10.9 |
| " | 17 | C | 11.6 | 846 | 8 | 8 | .0076 | 23.2 | 3.0 | 13.3 |
| " | 18 | C | 12.2 | 893 | 10 | 10 | .0087 | 16.4 | 2.2 | 12.3 |
| " | 19 | C | 6.3 | 845 | 16 | 16 | .0040 | 25.1 | 2.8 | 15.3 |
| " | 20 | C | 5.6 | 893 | 20 | 20 | .0039 | 18.7 | 2.7 | 13.3 |
| " | 21 | C | 3.0 | 844 | 32 | 32 | .0019 | 26.8 | 2.2 | 13.2 |
| Avg. | | | | | | | .0065 | | 2.5 | 13.1 |
| 72" Long | 22 | D | 8.0 | 858 | 16.5 | 16.5 | .014 | 20.7 | 2.2 | 8.2 |

TABLE 6

| Coke Drum | Run No. | Feed- stock | Coker By-Product Nominal Gas Velocity, ft/sec | Electrode CTE, $10^{-7}/°C$ by X-Ray Method | Electrode CTE, $10^{-7}/°C$ by Coarse-Grain Method | Median Particle Aspect Ratio* (3 × 6 mesh particles) |
|---|---|---|---|---|---|---|
| 14" Long | 1 | A | .0045 | 1.6 | 9.9 | 1.418 |
| " | 2 | A | .0030 | 1.1 | 8.9 | 1.435 |
| " | 3 | A | .0032 | 1.2 | 10.0 | 1.393 |
| " | 4 | A | .0031 | 1.1 | 9.7 | 1.420 |
| " | 5 | A | .0022 | 1.5 | 9.0 | 1.421 |
| " | 6 | A | .0013 | 1.0 | 9.9 | 1.393 |
| Avg. | | | .0029 | 1.3 | 9.6 | 1.413 |
| 72" Long | 7 | A | .057 | 1.7 | 7.7 | 1.439 |
| " | 8 | A | .023 | 1.3 | 5.9 | 1.456 |
| " | 9 | B | .059 | 1.6 | 7.9 | 1.380 |
| " | 10 | B | .048 | 1.4 | 7.4 | 1.399 |
| " | 11 | B | .045 | 1.6 | 7.9 | 1.400 |
| " | 12 | B | .039 | 1.8 | 6.4 | 1.451 |
| " | 13 | B | .019 | 1.0 | 6.5 | 1.410 |
| " | 14 | B | .031 | 1.7 | 8.4 | 1.472 |
| " | 15 | B | .026 | 1.2 | 7.6 | 1.439 |
| " | 22 | D | .014 | 2.2 | 8.2 | 1.387 |
| Avg. | | | .036 | 1.55 | 7.4 | 1.423 |
| Coking Operation A | 2 RUNS | | .142 | — | Avg. = 3.6 | Avg. = 1.52** |
| Coking Operation B | 2 RUNS | | .246 | Avg. = 2.4 | Avg. = 2.4 | Avg. = 1.56*** |

*Each number presented represents the median aspect ratio of roughly 400-500 particles.
**This number represents the average of 10 determinations of 400-500 particles each.
***This number represents the average of 7 determinations of 400-500 particles each.

The data presented in Table 6 plotted in FIG. 4 to show the correlation of coker by-product gas velocities versus average coarse-grain CTEs and median aspect ratios. The plot indicates that coarse-grain CTE on the order of $2.0 \times 10^{-7}/0°$ C. may be obtained at coker by-product gas velocity of 0.30 ft/sec or greater. The corresponding median aspect ratio would be from 1.60 to 1.62.

While certain embodiments and details have been shown for the purpose of illustrating the present invention, it will be apparent to those skilled in the art that various changes and modifications may be made herein without departing from the spirit or scope of the invention.

We claim:

1. In a premium coking process in which an aromatic mineral oil is subjected to delayed coking conditions in a coking drum to convert said mineral oil to premium coke and to volatile coking by-products having a predetermined nominal velocity in the coking drum, the improvement which comprises reducing the coarse grain CTE of said premium coke by increasing the nominal velocity of the volatile coking by-products in the coking drum above said predetermined nominal velocity.

2. The process of claim 1 in which the nominal velocity of the volatile coking by-products is increased to at least 0.30 ft/sec, said velocity being calculated as:

$$*V = F \times \left(1 - \frac{Y}{100}\right) \times \frac{T \times 3.29}{P \times M \times A}$$

where
V = nominal velocity of volatile coking by-products—ft/sec
F = mineral oil feed rate—g/sec
Y = coke yield—% of mineral oil feed
T = coke bed temperature in coking drum—°Rankine
P = coking drum pressure—psia
M = molecular weight of volatile coking by-products—g/g-mole
A = coking drum cross-sectional area—$in^2$.

3. The process of claim 1 in which the mineral oil is at least one material selected from the group consisting of decant oil, pyrolysis tar, vacuum resid, vacuum gas oil, thermal tar, heavy premium coker gas oil and virgin atmospheric gas oil.

4. The process of claim 3 in which the delayed coking is carried out at a temperature between about 800° F. and about 925° F., a pressure of between about 15 psig and about 200 psig and with a fill time of between about 12 and about 60 hours.

5. The process of claim 1 in which the velocity of the volatile coking by-products is increased by increasing the height of the coking drum while maintaining the coking drum fill time.

6. The process of claim 5 in which the mineral oil is at least one material selected from the group consisting of decant oil, pyrolysis tar, vacuum resid, vacuum gas oil, thermal tar, heavy premium coker gas oil and virgin atmospheric gas oil.

7. The process of claim 6 in which the delayed coking is carried out at a temperature between about 800° F. and about 925° F., a pressure of between about 15 psig and about 200 psig and with a fill time of between about 12 and about 60 hours.

8. The process of claim 1 in which the velocity of the volatile coking by-products is increased by decreasing the coking drum fill time.

9. The process of claim 8 in which the contents of the coking drum, after the coke drum fill has been completed, are subjected to a heat soak, wherein the minimum heat soak time is determined from:

$$\text{Time} = \exp(0.050 f_a - 42.8 + 52873/T)$$

where
T = temperature of the coke during the heat soak—°Rankine
Time — heat soak time—hours $f_a$ = the percentage of aromatic carbon atoms present in the mineral oil feed as determined by $C^{13}$ NMR analysis.

10. The process of claim 9 in which the mineral oil is at least one material selected from the group consisting of decant oil, pyrolysis tar, vacuum resid, vacuum gas oil, thermal tar, heavy premium coker gas oil and virgin atmospheric gas oil.

11. The process of claim 10 in which the delayed coking is carried out at a temperature between about 800° F. and about 925° F., a pressure of between about 15 psig and about 200 psig and with a fill time of between about 12 and about 60 hours.

12. The process of claim 1 in which the velocity of the volatile coking by-products is increased by reducing the mineral oil aromaticity and increasing the rate of feed of mineral oil to the coking drum to provide the desired velocity $V_n$ according to the following equations:

$$f_{a,n} = \leq [1633 - (V_n/V) \times (1633 - 17.1 \times f_a)]/17.1$$

$$R_n \geq R \times f_a/f_{a,n}$$

$f_a$ = percentage of aromatic-carbon atoms present in the initial mineral oil feed as determined by $C^{13}$ NMR analysis $f_{a,n}$ = percentage of aromatic carbon atoms present in the mineral oil of reduced aromaticity as determined by $C^{13}$ NMR analysis.

V = coke drum nominal velocity of the initial mineral oil feed—ft/sec $V_n$ = desired coke drum nominal velocity of mineral oil feed of reduced aromaticity-ft/sec R = initial mineral oil feed rate—gm/sec $R_n$ = feed rate of mineral oil of reduced aromaticity—gm/sec.

13. The process of claim 12 in which the mineral oil is at least one material selected from the group consisting of decant oil, pyrolysis tar, vacuum resid, vacuum gas oil, thermal tar, heavy premium coker gas oil and virgin atmospheric gas oil.

14. The process of claim 13 in which the delayed coking is carried out at a temperature between about 800° F. and about 925° F., a pressure of between about 15 psig and about 200 psig and with a fill time of between about 12 and about 60 hours.

15. The process of claim 12 in which the mineral oil feed aromaticity ($f_a$) is reduced by hydrotreating the mineral oil feed.

16. The process of claim 12 in which the mineral oil feed aromaticity ($f_a$) is reduced by reducing the severity of thermal cracking of mineral oil which is subjected to thermal cracking prior to use as coking feed.

17. The process of claim 12 in which the mineral oil feed aromaticity ($f_a$) is reduced by combining said feed with a mineral oil of lower aromaticity.

18. A process for producing premium coke having a low coarse grain CTE comprising:
   (a) charging an aromatic mineral oil to a coking drum,
   (b) subjecting said aromatic mineral oil to delayed coking conditions in said coking drum to form premium coke and volatile coking by-products, whereby
   (c) the volatile coking by-products produced from said mineral oil feed have a nominal velocity in said coking drum of at least 0.30 ft/sec, said velocity being calculated as:

$$V = F \times \left(1 - \frac{Y}{100}\right) \times \frac{T \times 3.29}{P \times M \times A}$$

where

V = nominal velocity of volatile coking by-products—ft/sec

F = mineral oil feed rate—g/sec

Y = coke yield—% of mineral oil feed

T = coke bed temperature in coking drum—°Rankine

P = coking drum pressure—psia

M = molecular weight of volatile coking by-products—g/g mole

A = coking drum cross-sectional area—in².

19. The process of claim 18 in which the mineral oil is at least one material selected from the group consisting of decant oil, pyrolysis tar, vacuum resid, vacuum gas oil, thermal tar, heavy premium coker gas oil and virgin atmospheric gas oil.

20. The process of claim 19 in which the delayed coking is carried out at a temperature between about 800° F. and about 925° F., a pressure of between about 15 psig and about 200 psig and with a fill time of between about 12 and about 60 hours.

* * * * *